United States Patent
Zhu et al.

(10) Patent No.: US 11,668,623 B2
(45) Date of Patent: Jun. 6, 2023

(54) MOVABLE SYSTEM FOR AUTOMATICALLY MONITORING THE CORRELATED WIND AND TEMPERATURE FIELD OF A BRIDGE

(71) Applicants: Southwest Jiaotong University, Chengdu (CN); Southwest Petroleum University, Chengdu (CN)

(72) Inventors: Jin Zhu, Chengdu (CN); Yongle Li, Chengdu (CN); Mengxue Wu, Chengdu (CN); Xu Huang, Chengdu (CN)

(73) Assignee: Southwest Jiaotong University, Chengdu (CN)

(*) Notice: Subject to any disclaimer, the term of this patent is extended or adjusted under 35 U.S.C. 154(b) by 0 days.

(21) Appl. No.: 17/983,412

(22) Filed: Nov. 9, 2022

(65) Prior Publication Data

US 2023/0141064 A1 May 11, 2023

(30) Foreign Application Priority Data

Nov. 11, 2021 (CN) .......................... 202111333715.5

(51) Int. Cl.
*G01M 5/00* (2006.01)
*G01W 1/02* (2006.01)
*G01W 1/00* (2006.01)

(52) U.S. Cl.
CPC ........ *G01M 5/0008* (2013.01); *G01M 5/0075* (2013.01); *G01W 1/02* (2013.01); *G01W 2001/006* (2013.01)

(58) Field of Classification Search
CPC ... G01M 5/0008; G01M 5/0075; G01W 1/02; G01W 2001/006
See application file for complete search history.

(56) References Cited

U.S. PATENT DOCUMENTS

2011/0133457 A1* 6/2011 Hoffmann ................ H02P 9/04
290/44

FOREIGN PATENT DOCUMENTS

CN 109856421 A * 6/2019
CN 109856421 A 6/2019
(Continued)

OTHER PUBLICATIONS

Jakobsson et al., Monitoring device for a wind turbine, 2014, WO2014122240A1, English translation downloaded from Espacenet on Feb. 10, 2023 (Year: 2014).*

(Continued)

*Primary Examiner* — Alexander Satanovsky
*Assistant Examiner* — Lyudmila Zaykova-Feldman
(74) *Attorney, Agent, or Firm* — Bayramoglu Law Offices LLC (57) ABSTRACT

A movable system for automatically monitoring the correlated wind and temperature filed of a bridge, including a bridge monitoring subsystem, a cloud server, and a client. The system monitors the meteorological parameters of a bridge surface and a temperature of a bridge structure, performs data analysis and processing on a cloud server, and performs visual data interaction by using a client. A bridge surface-specific meteorological parameter monitoring module is movable, such that the location of the sensor for meteorological data monitoring can be adjusted at any time to monitor an entire bridge deck in a time-sharing manner. A lower cantilever structure has an adjustable height, such that the sensor for meteorological data monitoring can track a height of a boundary layer of the bridge surface. A bridge structure-specific temperature monitoring module adopts distributed patch-type temperature sensors, which can detect the temperature of the bridge structure in all directions.

6 Claims, 3 Drawing Sheets

(56) References Cited

FOREIGN PATENT DOCUMENTS

| CN | 109887243 | A | * | 6/2019 | ............ G06F 30/23 |
| CN | 109887243 | A | | 6/2019 | |
| CN | 209978951 | U | * | 1/2020 | |
| CN | 209978951 | U | | 1/2020 | |
| CN | 111723509 | A | * | 9/2020 | ............ G06F 30/23 |
| CN | 111723509 | A | | 9/2020 | |
| CN | 113702659 | A | * | 11/2021 | .............. F03D 1/00 |
| JP | 2014215731 | A | | 11/2014 | |
| WO | WO-2014122240 | A1 | * | 8/2014 | .............. F03D 1/00 |

OTHER PUBLICATIONS

Huang et al., CN-109856421-A, A kind of removable wind environment around bridge observation device, 2019, English translation downloaded from Espacenet on Feb. 9, 2023 (Year: 2019).*

Chen et al., CN-109887243-A, Bridge health monitoring early warning system and its working method, 2019, English translation downloaded from Espacenet on Feb. 9, 2023 (Year: 2019).*

Cui et al., CN-209978951-U, Bridge structure health monitoring system, 2019, English translation downloaded from Espacenet on Feb. 9, 2023 (Year: 2019).*

Ai et al., CN-111723509-A, Bridge structure temperature field monitoring method, 2020, English translation downloaded from Espacenet on Feb. 9, 2023 (Year: 2020).*

Shi et al., CN-113702659-A, Bridge construction monitored control system based on thing networking 2021, English translation downloaded from Espacenet on Feb. 9, 2023 (Year: 2021).*

* cited by examiner

MOVABLE SYSTEM FOR AUTOMATICALLY MONITORING THE CORRELATED WIND AND TEMPERATURE FIELD OF A BRIDGE

CROSS REFERENCE OF THE RELATED APPLICATION

The present invention is based on and claims priority to Chinese patent application No. 202111333715.5 filed on Nov. 11, 2021, the entire content of which is incorporated herein by reference.

TECHNICAL FIELD

The present disclosure relates to the field of bridge engineering and specifically to a movable system for automatically monitoring the correlated wind and temperature field of a bridge.

BACKGROUND

In recent years, with the promotion of traffic construction, more bridges with a kilometer-scale ultra-long span are being built and planned. As an infrastructure, a bridge is exposed to the natural environment all year round and is inevitably affected by seasonal temperature changes, short-term strong cooling, strong solar radiation, and windy weather. Due to constraints, the secondary internal force is generated inside the bridge due to the variation in ambient temperature, which may result in problems such as the cracking of a bridge deck, lifting of a bearing, and even damage and destruction of the bridge. Consequently, the impact of the temperature effect on bridges may well exceed that of dead load and live load, resulting in great harm to the durability and safe operation of the bridge.

Heat exchange between a bridge structure and its surrounding environment mainly takes place in two forms, i.e., the thermal radiation and thermal convection. Thermal radiation refers to the solar radiation, which usually acts directly on the surface of the structure, while thermal convection mainly performs heat exchange with the bridge structure through the flow of atmosphere around the bridge. It is worth noting that due to the viscousness of a bridge surface, a flow field distribution on the surface of the structure decreases rapidly within a certain distance of the bridge deck, forming a boundary layer. Similarly, the fluid temperature on the bridge surface also has a thermal boundary layer, and the distribution of the thermal boundary layer is related to the environmental parameters (e.g., wind speed, wind direction, and temperature) and the location of the bridge surface. Therefore, to understand the characteristics of a flow field on the bridge surface (an atmospheric flow velocity and a temperature distribution of the bridge surface) and a mechanism of interaction between a wind field of the bridge surface and a solid temperature field, it is necessary to measure the wind speed at the height of the boundary layer (including a fluid boundary layer and the thermal boundary layer) of the bridge surface.

Because the environmental parameters of the bridge surface change with time, the height of the boundary layer also changes with time. In addition, the height of the boundary layer varies with a spatial location of a test tower. All these make it difficult to measure the wind speed at the height of the boundary layer. In addition, the measurement equipment (or sensors) are usually fixed on the bridge surface or the test tower, which means that the location of the measurement equipment (or sensors) cannot be adjusted in real time.

SUMMARY

To overcome the above shortcomings in the prior art, a movable system for automatically monitoring the correlated wind and temperature field of a bridge is provided in the present disclosure to resolve the problems that the prior art cannot automatically monitor the correlated wind speed temperature field of a bridge and cannot adjust the location of measurement equipment (or sensors) in real-time.

To achieve the foregoing objective of the present disclosure, the present disclosure adopts the following technical solutions:

A movable system for automatically monitoring the correlated wind and temperature filed of a bridge includes a bridge monitoring subsystem, a cloud server, and a client.

The bridge monitoring subsystem is configured to monitor the environmental meteorological parameters of a bridge surface and a temperature change of a bridge structure and is communicatively connected to the cloud server.

The cloud server is configured to analyze the environmental meteorological parameters of the bridge surface and temperature data of the bridge structure to generate a wind profile of a bridge deck and a temperature distribution of the bridge structure and provide visualization of atmospheric environmental parameters of the surface of the bridge structure and is communicatively connected to the client.

The client is configured to display and store the wind profile of the bridge deck, the temperature distribution of the bridge structure, and visual atmospheric environmental data of the surface of the bridge structure.

Further, the bridge monitoring subsystem includes a bridge surface-specific meteorological parameter monitoring module and at least one bridge structure-specific temperature monitoring module.

The bridge surface-specific meteorological parameter monitoring module is configured to monitor the environmental parameters of the bridge surface and track and monitor wind speed and temperature at a boundary layer whose height changes with the environmental parameters of the bridge surface and is communicatively connected to the cloud server.

The bridge structure-specific temperature monitoring module is configured to monitor the temperature of the bridge structure and is communicatively connected to the cloud server.

Further, the cloud server includes an environmental parameter processing module, a bridge wind temperature analysis module, and a structure temperature analysis module.

The environmental parameter processing module is configured to receive the environmental meteorological parameters of the bridge surface and perform time-based processing based on an atmospheric flow velocity, an air flow direction, a fluid temperature, and solar radiation on the bridge surface to obtain the wind profile, a temperature profile, and a solar radiation time-history curve of the bridge surface and is communicatively connected to the bridge surface-specific meteorological parameter monitoring module, all the bridge structure-specific temperature monitoring modules, and the client separately.

The bridge wind temperature analysis module is configured to perform processing based on the flow velocity and the temperature of the air near the bridge surface to obtain a flow field and a temperature field of the air near the bridge surface and is communicatively connected to the bridge surface-specific meteorological parameter monitoring module, all the bridge structure-specific temperature monitoring modules, and the client separately.

The structure temperature analysis module is configured to perform processing based on temperature data of a bridge cross-section to obtain a real-time temperature field distribution result of the bridge cross-section and is communicatively connected to the bridge surface-specific meteorological parameter monitoring module, all the bridge structure-specific temperature monitoring modules, and the client separately.

Further, the client includes a data receiving module, a data storage module, and a liquid crystal display (LCD).

The data receiving module is configured to transmit and receive data to and from the cloud server and is communicatively connected to the environmental parameter processing module, the bridge wind temperature analysis module, the structure temperature analysis module, the data storage module, and the LCD separately.

The data storage module is configured to store data sent by the cloud server.

The LCD is configured to display the wind profile of the bridge deck, the temperature distribution of the bridge structure, and the visual atmospheric environmental data of the surface of the bridge structure.

Further, the bridge surface-specific meteorological parameter monitoring module includes a movable platform, a test tower, a top cantilever structure, N upper cantilever structures, M lower cantilever structures, M lower cantilever structure adjustment devices, a solar panel, a solar radiation sensor, a wind temperature sensing unit, a movable platform servo motor, a lead storage battery, and a bridge surface-specific meteorological parameter monitoring module controller, where N and M are positive integers.

The test tower, the movable platform servo motor, the lead storage battery, and the bridge surface-specific meteorological parameter monitoring module controller are all located on the movable platform and are fixedly connected to the movable platform.

The test tower is sequentially provided with the M lower cantilever structures, the N upper cantilever structures, and the top cantilever structure from bottom to top. The M lower cantilever structures are movably connected to the test tower through the M lower cantilever structure adjustment devices respectively. The N upper cantilever structures and the top cantilever structure each are fixedly connected to the test tower.

The M lower cantilever structures and the N upper cantilever structures are all single-cantilever structures, and a cantilever end is provided with the wind temperature sensing unit.

The top cantilever structure is a double-cantilever structure, where the end of the first cantilever is provided with the solar panel, the end of a second cantilever is provided with the wind temperature sensing unit, and the top cantilever structure is also provided with the solar radiation sensor.

The solar panel is electrically connected to the lead storage battery, and the lead storage battery is electrically connected to the bridge surface-specific meteorological parameter monitoring module controller. The bridge surface-specific meteorological parameter monitoring module controller is configured to obtain data from the wind temperature sensing unit and the solar radiation sensor, drive the movable platform servo motor and the M lower cantilever structure adjustment devices, and perform data exchange with the cloud server. The bridge surface-specific meteorological parameter monitoring module controller is electrically connected to the movable platform servo motor and the M lower cantilever structure adjustment devices separately and communicatively connected to the solar radiation sensor, the wind temperature sensing unit, and the cloud server separately.

Further, the lower cantilever structure adjustment device includes a cantilever bracket servo motor and at least three cantilever bracket moving wheels.

The cantilever bracket moving wheel is fixedly connected to the lower cantilever structure and distributed around the test tower and is configured to fasten the test tower by using a wheel edge, build a movable connection between the lower cantilever structure and the test tower, and rotate under control of the cantilever bracket servo motor to make the lower cantilever structure move up and down.

A rotor of the cantilever bracket servo motor is fixedly connected to the rotating shafts of all the cantilever bracket moving wheels.

Further, the bridge surface-specific meteorological parameter monitoring module controller includes a data collection unit, a processor unit, a first programmable logic controller, a second programmable logic controller, and an integrated data transmission module.

The data collection unit is configured to obtain the data from the wind temperature sensing unit and the solar radiation sensor and is communicatively connected to the wind temperature sensing unit, the solar radiation sensor, and the processor unit separately.

The processor unit is configured to calculate the height of the boundary layer of the bridge surface under current environmental parameters through signal processing and call the first programmable logic controller and the second programmable logic controller to adjust the location of the bridge surface-specific meteorological parameter monitoring module and heights of the M lower cantilever structures and is communicatively connected to the first programmable logic controller, the second programmable logic controller, and the integrated data transmission module separately.

The first programmable logic controller is configured to drive the movable platform servo motor to adjust the location of the bridge surface-specific meteorological parameter monitoring module and is electrically connected to the movable platform servo motor.

The second programmable logic controller is configured to drive the cantilever bracket servo motor to adjust the height of the lower cantilever structure and is electrically connected to the cantilever bracket servo motor of the M lower cantilever structure adjustment devices.

The integrated data transmission module is configured to send the data of the wind temperature sensing unit and the solar radiation sensor to the cloud server and is communicatively connected to the cloud server.

Further, the bridge structure-specific temperature monitoring module includes a temperature data collection box and L patch-type temperature sensors, where the L patch-type temperature sensors are distributed on an inner surface of the bridge cross-section and a bridge pavement and are communicatively connected to the temperature data collection box through a data cable; the temperature data collection box is also communicatively connected to the cloud server.

The present disclosure has the following beneficial effects:

(1) The present disclosure jointly monitors the meteorological parameters of the bridge surface and the temperature of the bridge structure, performs data analysis and processing on the cloud server, and performs visual data interaction by using the client.

(2) The bridge surface-specific meteorological parameter monitoring module is movable, such that the location of the sensor for meteorological data monitoring can be adjusted at any time to monitor the entire bridge deck in a time-sharing manner.

(3) The lower cantilever structure has an adjustable height, such that the sensor for meteorological data monitoring can track the height of the boundary layer of the bridge surface and adaptively adjust the location of the sensor in real-time.

(4) The bridge structure-specific temperature monitoring module adopts distributed patch-type temperature sensors, which can detect the temperature of the bridge structure in all directions.

(5) The client not only exchanges data but also stores data for a long time.

Reference numerals: 1: movable platform; 2: test tower; 3: top cantilever structure; 4: upper cantilever structure; 7: lower cantilever structure; 6: lower cantilever structure adjustment device; 6-1: cantilever bracket servo motor; 6-2: cantilever bracket moving wheel; 7: solar panel; 8: solar radiation sensor: 9: wind temperature sensing unit: 10: movable platform servo motor; 11: lead storage battery; 12: bridge surface-specific meteorological parameter monitoring module controller; 13: temperature data collection box; 14: patch-type temperature sensor; 15: data cable; 16: bridge pavement; and 17: bridge cross-section.

DETAILED DESCRIPTION OF THE EMBODIMENTS

The specific implementations of the present disclosure are described below to facilitate those skilled in the art to understand the present disclosure, but it should be clear that the present disclosure is not limited to the scope of the specific implementations. Various obvious changes made by those of ordinary skill in the art within the spirit and scope of the present disclosure defined by the appended claims should fall within the protection scope of the present disclosure.

Figure 1:
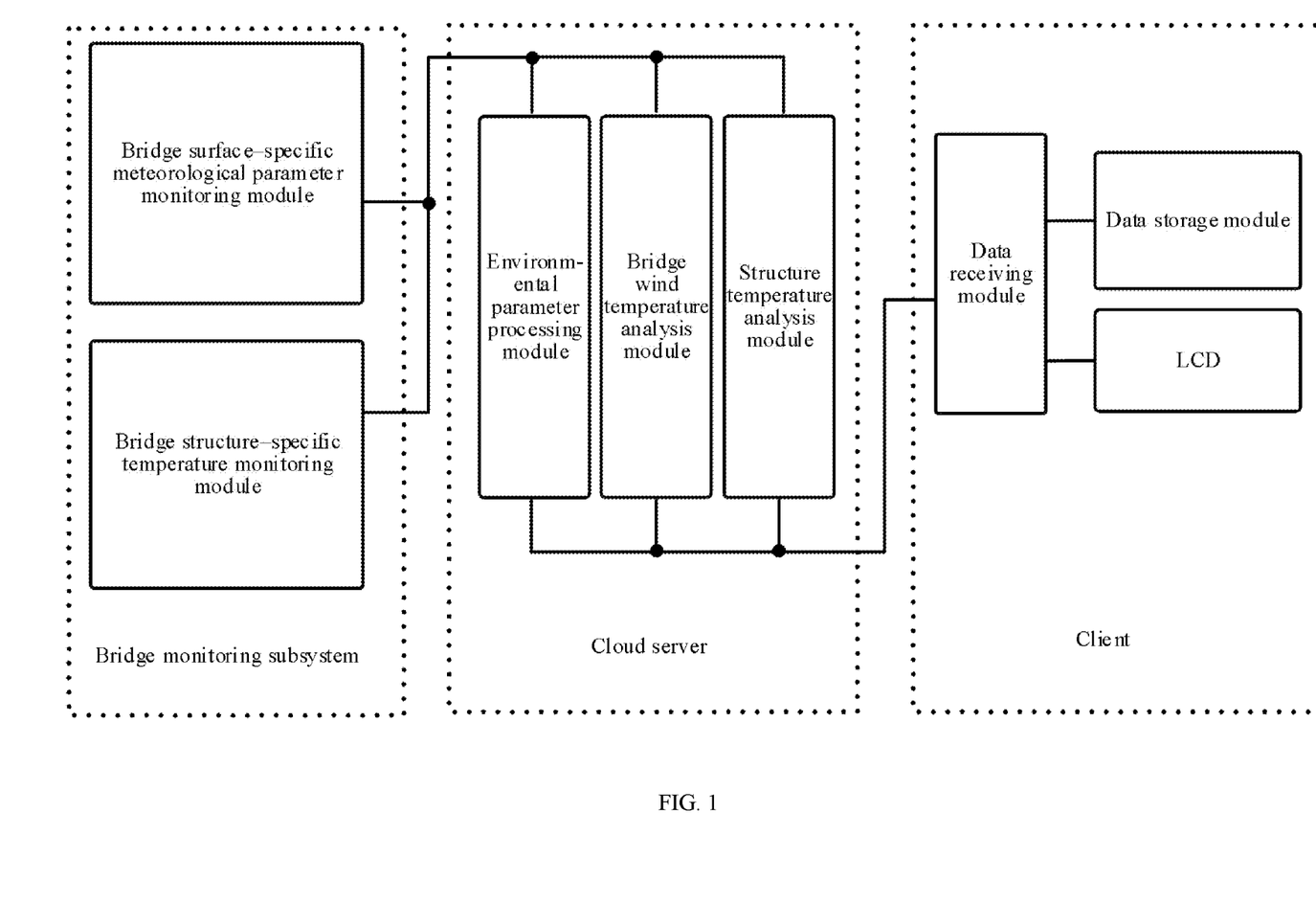
FIG. 1 is a schematic structural diagram of a movable system for automatically monitoring the correlated wind and temperature filed of a bridge according to an embodiment of the present disclosure.

As shown in FIG. 1, in an embodiment of the present disclosure, a movable system for automatically monitoring the correlated wind and temperature filed of a bridge includes a bridge monitoring subsystem, a cloud server, and a client. The bridge monitoring subsystem is configured to monitor the environmental meteorological parameters of a bridge surface and the temperature change of the bridge structure and is communicatively connected to the cloud server. The cloud server is configured to analyze the environmental meteorological parameters of the bridge surface and temperature data of the bridge structure to generate a wind profile of a bridge deck and a temperature distribution of the bridge structure and provide visualization of atmospheric environmental parameters of a surface of the bridge structure and is communicatively connected to the client. The client is configured to display and store the wind profile of the bridge deck, the temperature distribution of the bridge structure, and visual atmospheric environmental data of the surface of the bridge structure.

The bridge monitoring subsystem includes a bridge surface-specific meteorological parameter monitoring module and at least one bridge structure-specific temperature monitoring module. The bridge surface-specific meteorological parameter monitoring module is configured to monitor the environmental parameters of the bridge surface and track and monitor wind speed and temperature at a boundary layer whose height changes with the environmental parameters of the bridge surface and is communicatively connected to the cloud server. The bridge structure-specific temperature monitoring module is configured to monitor the temperature of the bridge structure and is communicatively connected to the cloud server.

The cloud server includes an environmental parameter processing module, a bridge wind temperature analysis module, and a structure temperature analysis module. The environmental parameter processing module is configured to receive the environmental meteorological parameters of the bridge surface and perform time-based processing based on an atmospheric flow velocity, an air flow direction of the atmosphere, a fluid temperature, and solar radiation on the bridge surface to obtain the wind profile, a temperature profile, and a solar radiation time-history curve of the bridge surface and is communicatively connected to the bridge surface-specific meteorological parameter monitoring module, all the bridge structure-specific temperature monitoring modules, and the client separately. The bridge wind temperature analysis module is configured to perform processing based on a flow velocity and the temperature of the air near the bridge surface to obtain a flow field and a temperature field of the air near the bridge surface and is communicatively connected to the bridge surface-specific meteorological parameter monitoring module, all bridge structure-specific temperature monitoring modules, and the client separately. The structure temperature analysis module is configured to perform processing based on temperature data of a bridge cross-section to obtain a real-time temperature field distribution result of the bridge cross-section and is communicatively connected to the bridge surface-specific meteorological parameter monitoring module, all the bridge structure-specific temperature monitoring modules, and the client separately.

The client includes a data receiving module, a data storage module, and an LCD. The data receiving module is configured to transmit and receive data to and from the cloud server and is communicatively connected to the environmental parameter processing module, the bridge wind temperature analysis module, the structure temperature analysis module, the data storage module, and the LCD separately. The data storage module is configured to store data sent by the cloud server. The LCD is configured to display the wind profile of the bridge deck, the temperature distribution of the bridge structure, and the visual atmospheric environmental data of the surface of the bridge structure.

Figure 2:
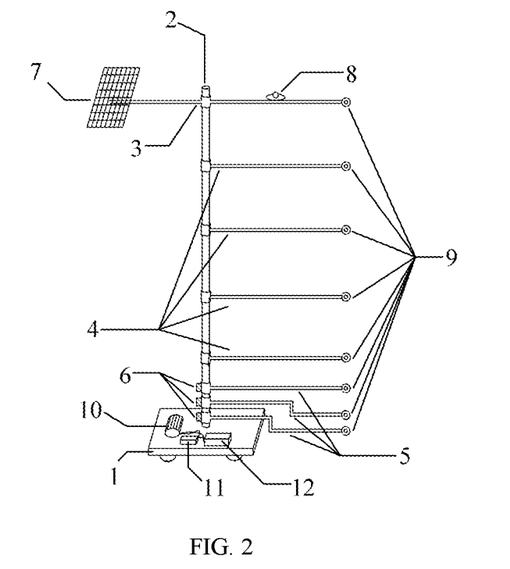
FIG. 2 is a structural diagram of a bridge surface-specific meteorological parameter monitoring module according to an embodiment of the present disclosure.

As shown in FIG. 2, the bridge surface-specific meteorological parameter monitoring module includes movable platform 1, test tower 2, top cantilever structure 3, N upper cantilever structures 4, M lower cantilever structures 5, M lower cantilever structure adjustment devices 6, solar panel 7, solar radiation sensor 8, wind temperature sensing unit 9, movable platform servo motor 10, lead storage battery 11, and bridge surface-specific meteorological parameter monitoring module controller 12, where N and M are positive integers.

In this embodiment, N is 4, and M is 3. The test tower 2 is 5 m high, and the height range of each of the M lower cantilever structures 5 is 1 m. There are two packs of lead storage batteries 11, and each pack has an output voltage of 12 V and a storage capacity of 100 A.

The test tower 2, the movable platform servo motor 10, the lead storage battery 11, and the bridge surface-specific meteorological parameter monitoring module controller 12 are all located on the movable platform 1 and are fixedly connected to the movable platform 1.

The test tower 2 is sequentially provided with the M lower cantilever structures 5, the N upper cantilever structures 4, and the top cantilever structure 3 from bottom to top. The M lower cantilever structures 5 are movably connected to the test tower 2 through the M lower cantilever structure adjustment devices 6, respectively. The N upper cantilever structures 4 and the top cantilever structure 3 each are fixedly connected to the test tower 2.

The M lower cantilever structures 5 and the N upper cantilever structures 4 are all single-cantilever structures, and a cantilever end is provided with the wind temperature sensing unit 9.

The top cantilever structure 3 is a double-cantilever structure, where an end of the first cantilever is provided with the solar panel 7, an end of a second cantilever is provided with the wind temperature sensing unit 9, and the top cantilever structure 3 is also provided with the solar radiation sensor 8.

The solar panel 7 is electrically connected to the lead storage battery 11, and the lead storage battery 11 is electrically connected to the bridge surface-specific meteorological parameter monitoring module controller 12.

The bridge surface-specific meteorological parameter monitoring module controller 12 is configured to obtain data from the wind temperature sensing unit 9 and the solar radiation sensor 8, drive the movable platform servo motor 10 and the M lower cantilever structure adjustment devices 6, and perform data exchange with the cloud server. The bridge surface-specific meteorological parameter monitoring module controller 12 is electrically connected to the movable platform servo motor 10 and the M lower cantilever structure adjustment devices 6 separately and communicatively connected to the solar radiation sensor 8, the wind temperature sensing unit 9, the solar radiation sensor 8, and the cloud server separately.

The wind temperature sensing unit 9 in this embodiment includes a wind speed sensor, a wind direction sensor, and a temperature sensor.

Figure 3:
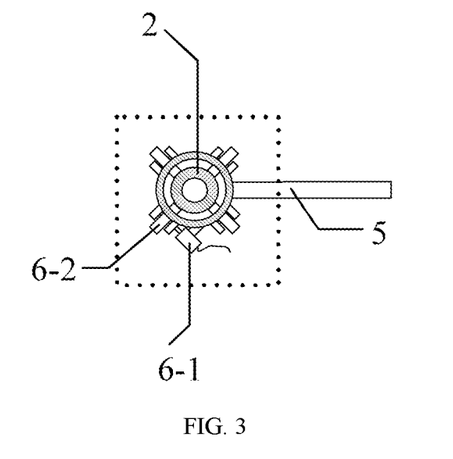
FIG. 3 is a structural diagram of a lower cantilever structure adjustment device according to an embodiment of the present disclosure.

As shown in FIG. 3, the lower cantilever structure adjustment device 6 includes a cantilever bracket servo motor 6-1 and at least three cantilever bracket moving wheels 6-2. The cantilever bracket moving wheel 6-2 is fixedly connected to the lower cantilever structure 5 and distributed around the test tower 2. The cantilever bracket moving wheel 6-2 is configured to fasten the test tower 2 by using a wheel edge, provide a movable connection between the lower cantilever structure 5 and the test tower 2, and rotate under the control of the cantilever bracket servo motor 6-1 to make the lower cantilever structure 5 move up and down. A rotor of the cantilever bracket servo motor 6-1 is fixedly connected to the rotating shafts of all the cantilever bracket moving wheels 6-2.

Figure 4:
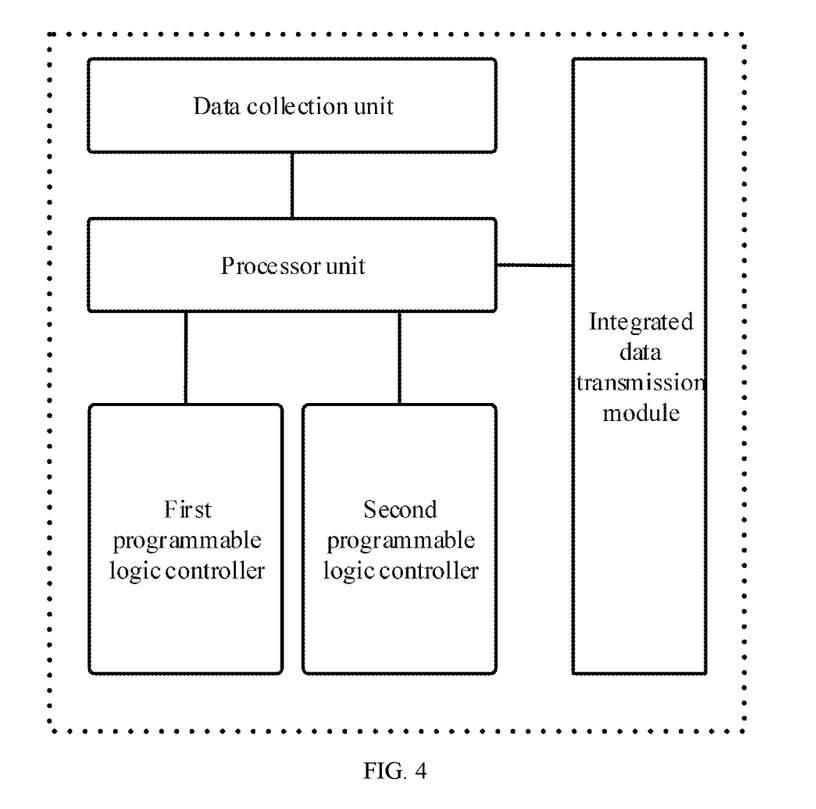
FIG. 4 is a schematic structural diagram of a bridge surface-specific meteorological parameter monitoring module controller according to an example of the present disclosure.

As shown in FIG. 4, the bridge surface-specific meteorological parameter monitoring module controller 12 includes a data collection unit, a processor unit, a first programmable logic controller, a second programmable logic controller, and an integrated data transmission module.

The data collection unit is configured to obtain the data from the wind temperature sensing unit 9 and the solar radiation sensor 8 and is communicatively connected to the wind temperature sensing unit 9, the solar radiation sensor 8, and the processor unit separately.

The processor unit is configured to calculate the height of the boundary layer of the bridge surface under current environmental parameters through signal processing and drive the first programmable logic controller and the second programmable logic controller to adjust a location of the bridge surface-specific meteorological parameter monitoring module and heights of the M lower cantilever structures 5. The processor unit is communicatively connected to the first programmable logic controller, the second programmable logic controller, and the integrated data transmission module separately.

The first programmable logic controller is configured to drive the movable platform servo motor 10 to adjust the location of the bridge surface-specific meteorological parameter monitoring module and is electrically connected to the movable platform servo motor 10.

The second programmable logic controller is configured to drive the cantilever bracket servo motor 6-1 to adjust the height of the lower cantilever structure 5 and is electrically connected to the cantilever bracket servo motor 6-1 of the M lower cantilever structure adjustment devices 6.

The integrated data transmission module is configured to send the data of the wind temperature sensing unit 9 and the solar radiation sensor 8 to the cloud server and is communicatively connected to the cloud server.

In the 1990s, a technological improvement can be clearly defined as a hardware improvement (for example, an improvement of a circuit structure such as a diode, a transistor, or a switch) or a software improvement (for example, an improvement of a set of instructions or program). However, with the development of technologies, improvements in many programs can be regarded as direct improvements to hardware circuit structures. Almost all designers obtain a corresponding hardware circuit structure by programming an improved set of instructions into a hardware circuit. Therefore, it is not meant that an improvement of a program cannot be realized by using a hardware entity module, for example, a programmable logic device (PLD) (such as a field programmable gate array (FPGA)), which is such an integrated circuit, and its logic function is determined by programming the device by a user. A designer can "integrate" a digital system onto a PLD through programming without requiring a chip manufacturer to design and manufacture a special integrated circuit chip. Nowadays, this kind of programming replaces manual manufacturing of an integrated circuit chip and is mostly realized by using a "logic compiler". The logic compiler is similar to a software compiler used to develop and compile a program and original code before compilation needs to be compiled in a specific programming language that is referred to as a hardware description language (HDL) herein. There are many kinds of HDLs, such as an advanced Boolean expression language (ABEL), an Altera hardware description language (AHDL), Confluence, a Cornell university programming language (CUPL), HDCal, a Java hardware description language (JHDL), Lava, Lola, MyHDL, PALASM, and a Ruby hardware description language (RHDL). At present, a very-high-speed integrated circuit hardware description language (VHDL) and Verilog are most commonly used. It should be understood by a person skilled in the art that a hardware circuit of a logic program can be easily obtained by using the above hardware description languages to perform logic programming and programming the set of instructions into an integrated circuit.

The data collection unit and the processor unit may be implemented in any appropriate way. For example, the data collection unit and the processor unit may be a microprocessor or processor, a computer-readable medium, a logic gate, a switch, an application specific integrated circuit (ASIC), a programmable logic controller, or an embedded microcontroller that stores computer-readable program code (such as software or firmware) executable by the microprocessor or processor. For example, the controller includes but is not limited to the following microcontrollers: ARC 625D, Atmel AT91SAM, Microchip PIC18F26K20, and Silicon Labs C8051F320. A memory controller may also be implemented as part of the control logic of memory. Persons skilled in the art are aware that in addition to being realized by using pure computer-readable program code, the controller can realize the same function in a form of the logic gate, the switch, the ASIC, the programmable logic controller, or the embedded microcontroller by performing logic programming on a method step. Therefore, the data collection unit and the processor unit may be considered as hardware components, and apparatuses for implementing various functions in the data collection unit and the processor unit may also be considered as structures in the hardware component, or even the apparatuses for implementing various functions may be considered as software modules for implementing the method as well as the structures in the hardware component.

For ease of description, the foregoing platform and terminal are divided into various modules based on functions for separate descriptions. Certainly, functions of different modules may be implemented in one or more pieces of software and/or hardware during one or more implementations of this specification, or modules having the same functions are implemented by a combination of a plurality of submodules or subunits. The described apparatus embodiment is merely schematic. For example, the unit division is merely a logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

In this embodiment, both the first programmable logic controller and the second programmable logic controller are PLC153.

Figure 5:
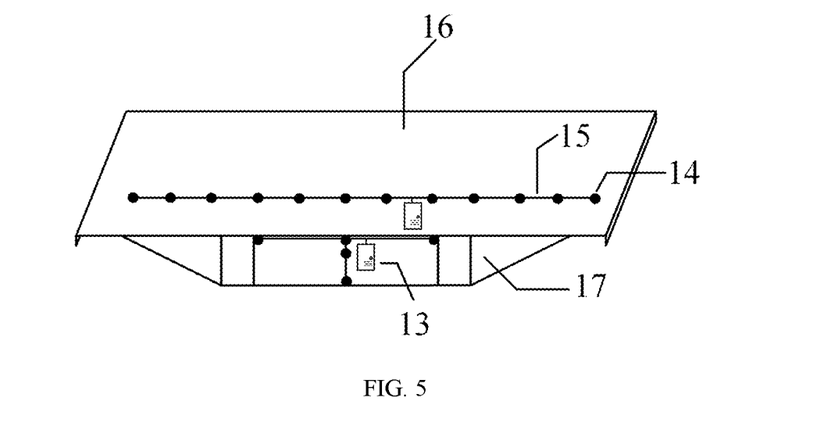
FIG. 5 is a structural diagram of a bridge structure-specific temperature monitoring module.

As shown in FIG. 5, the bridge structure-specific temperature monitoring module includes temperature data collection box 13 and L patch-type temperature sensors 14. The L patch-type temperature sensors 14 are distributed on the inner surface of the bridge cross-section 17 and bridge pavement 16 and are communicatively connected to the temperature data collection box 13 through data cable 15. The temperature data collection box 13 is also communicatively connected to the cloud server.

The movable system for automatically monitoring the correlated wind and temperature field of the bridge provided in this embodiment is used to automatically monitor the wind speed at the height of the boundary layer of the bridge surface and the fluid temperature on the bridge surface and can automatically move to a measurement point set along a transverse direction of the bridge deck. The environmental data of the bridge surface is collected by using the movable platform. The height of the boundary layer of the bridge surface can be calculated based on actually measured environmental parameters at the top of the test tower. The height of the sensor can be adjusted in real-time by using the servo motor on the bottom cantilever to keep the sensor at a location of the boundary layer. The height of the boundary layer of the bridge surface varies with the wind speed and the location, and existing testing technology cannot enable the height of the sensor to vary with the wind speed and the location in real-time. Therefore, the existing technology cannot accurately measure the environmental parameters at the height of the boundary layer of the bridge surface, which makes it unable to effectively research an interaction mechanism of the wind field of the bridge surface and a solid temperature field. The present disclosure brings a real-time wind speed at a higher location of the bridge surface into a boundary layer height calculation formula and calls the servo motor on a cantilever at the bottom of the test tower to adjust the height of the sensor in real-time, such that the sensor is kept at the height of the boundary layer. The movable platform is used to automatically move a location of the test tower along set measurement points on the bridge surface and perform the measurement. In addition, temperature field distributions on the surface of and inside the bridge are also measured to conduct a wind-temperature joint test on the bridge structure, which provides technical support for researching a wind-temperature coupling and interaction mechanism of the bridge structure.

In this specification, specific embodiments are used to describe the principle and implementations of the present disclosure, and the description of the embodiments is only intended to help explain the method and core idea of the present disclosure. Meanwhile, a person of ordinary skill in the art may make modifications with respect to the specific implementations and the application scope based on the idea of the present disclosure. Therefore, the content of this specification shall not be construed as a limitation to the present disclosure.

Those of ordinary skill in the art will understand that the embodiments described herein are intended to help readers understand the principles of the present disclosure, and it should be understood that the protection scope of the present disclosure is not limited to such special statements and embodiments. Those of ordinary skill in the art may make other various specific modifications and combinations according to the technical teachings disclosed in the present disclosure without departing from the essence of the present disclosure, and such modifications and combinations still fall within the protection scope of the present disclosure.

What is claimed is:

1. A movable system for automatically monitoring a correlated wind and temperature field of a bridge, comprising a bridge monitoring subsystem, a cloud server, and a client, wherein the bridge monitoring subsystem is configured to monitor environmental meteorological parameters of a bridge surface and a temperature change of a bridge structure and is communicatively connected to the cloud server;

wherein the bridge monitoring subsystem comprises a bridge surface-specific meteorological parameter monitoring module and at least one bridge structure-specific temperature monitoring module;

the bridge surface-specific meteorological parameter monitoring module is configured to monitor environmental parameters of the bridge surface, and track and monitor wind speed and temperature at a boundary layer whose height changes with the environmental parameters of the bridge surface, and is communicatively connected to the cloud server; and the at least one bridge structure-specific temperature monitoring module is configured to monitor a temperature of the bridge structure and is communicatively connected to the cloud server;

wherein the bridge surface-specific meteorological parameter monitoring module comprises a movable platform, a test tower, a top cantilever structure, N upper cantilever structures, M lower cantilever structures, M lower cantilever structure adjustment devices, a solar panel, a solar radiation sensor, a wind temperature sensing unit, a movable platform servo motor, a lead storage battery, and a bridge surface-specific meteorological parameter monitoring module controller, wherein N and M are positive integers;

the test tower, the movable platform servo motor, the lead storage battery, and the bridge surface-specific meteorological parameter monitoring module controller are all located on the movable platform and are fixedly connected to the movable platform;

the test tower is sequentially provided with the M lower cantilever structures, the N upper cantilever structures, and the top cantilever structure from bottom to top; the M lower cantilever structures are movably connected to the test tower through the M lower cantilever structure adjustment devices respectively; and the N upper cantilever structures and the top cantilever structure each are fixedly connected to the test tower;

the M lower cantilever structures and the N upper cantilever structures are all single-cantilever structures, and a cantilever end is provided with the wind temperature sensing unit;

the top cantilever structure is a double-cantilever structure, wherein an end of a first cantilever is provided with the solar panel, and an end of a second cantilever is provided with the wind temperature sensing unit; and the top cantilever structure is also provided with the solar radiation sensor;

the solar panel is electrically connected to the lead storage battery, and the lead storage battery is electrically connected to the bridge surface-specific meteorological parameter monitoring module controller; and the bridge surface-specific meteorological parameter monitoring module controller is configured to obtain data from the wind temperature sensing unit and the solar radiation sensor, drive the movable platform servo motor and the M lower cantilever structure adjustment devices, and perform data exchange with the cloud server, and is electrically connected to the movable platform servo motor and the M lower cantilever structure adjustment devices separately and communicatively connected to the solar radiation sensor, the wind temperature sensing unit, and the cloud server separately;

wherein the cloud server is configured to analyze the environmental meteorological parameters of the bridge surface and temperature data of the bridge structure to generate a wind profile of a bridge deck and a temperature distribution of the bridge structure, and provide a visualization of atmospheric environmental parameters of a surface of the bridge structure, and is communicatively connected to the client; and the client is configured to display and store the wind profile of the bridge deck, the temperature distribution of the bridge structure, and visual atmospheric environmental data of the surface of the bridge structure.

2. The movable system for automatically monitoring the correlated wind and temperature field of the bridge according to claim 1, wherein the cloud server comprises an environmental parameter processing module, a bridge wind temperature analysis module, and a structure temperature analysis module, wherein the environmental parameter processing module is configured to receive the environmental meteorological parameters of the bridge surface and perform a time-based processing based on an atmospheric flow velocity, an air flow direction, a fluid temperature, and solar radiation on the bridge surface to obtain the wind profile, a temperature profile, and a solar radiation time-history curve of the bridge surface and is communicatively connected to the bridge surface-specific meteorological parameter monitoring module, each of the at least one bridge structure-specific temperature monitoring module, and the client separately;

the bridge wind temperature analysis module is configured to perform a processing based on a flow velocity and a temperature of air near the bridge surface to obtain a flow field and a temperature field of the air near the bridge surface and is communicatively connected to the bridge surface-specific meteorological parameter monitoring module, each of the at least one bridge structure-specific temperature monitoring module, and the client separately; and the structure temperature analysis module is configured to perform a processing based on temperature data of a bridge cross-section to obtain a real-time temperature field distribution result of the bridge cross-section and is communicatively connected to the bridge surface-specific meteorological parameter monitoring module, each of the at least one bridge structure-specific temperature monitoring module, and the client separately.

3. The movable system for automatically monitoring the correlated wind and temperature field of the bridge according to claim 2, wherein the client comprises a data receiving module, a data storage module, and a liquid crystal display (LCD), wherein the data receiving module is configured to transmit and receive data to and from the cloud server and is communicatively connected to the environmental parameter processing module, the bridge wind temperature analysis module, the structure temperature analysis module, the data storage module, and the LCD separately;

the data storage module is configured to store data sent by the cloud server; and the LCD is configured to display the wind profile of the bridge deck, the temperature distribution of the bridge structure, and the visual atmospheric environmental data of the surface of the bridge structure.

4. The movable system for automatically monitoring the correlated wind and temperature field of the bridge according to claim 1, wherein the lower cantilever structure adjustment device comprises a cantilever bracket servo motor and at least three cantilever bracket moving wheels, wherein the cantilever bracket moving wheel is fixedly connected to the lower cantilever structure and distributed around the test tower and is configured to fasten the test tower by using a wheel edge, build a movable connection between the lower cantilever structure and the test tower, and rotate under control of the cantilever bracket servo motor to make the lower cantilever structure move up and down; and a rotor of the cantilever bracket servo motor is fixedly connected to rotating shafts of all the cantilever bracket moving wheels.

5. The movable system for automatically monitoring the correlated wind and temperature field of the bridge according to claim 4, wherein the bridge surface-specific meteorological parameter monitoring module controller comprises a data collection unit, a processor unit, a first programmable logic controller, a second programmable logic controller, and an integrated data transmission module, wherein the data collection unit is configured to obtain the data from the wind temperature sensing unit and the solar radiation sensor and is communicatively connected to the wind temperature sensing unit, the solar radiation sensor, and the processor unit separately;

the processor unit is configured to calculate the height of the boundary layer of the bridge surface under current environmental parameters through signal processing and call the first programmable logic controller and the second programmable logic controller to adjust a location of the bridge surface-specific meteorological parameter monitoring module and heights of the M lower cantilever structures, and is communicatively connected to the first programmable logic controller, the second programmable logic controller, and the integrated data transmission module separately;

the first programmable logic controller is configured to drive the movable platform servo motor to adjust the location of the bridge surface-specific meteorological parameter monitoring module and is electrically connected to the movable platform servo motor;

the second programmable logic controller is configured to drive the cantilever bracket servo motor to adjust the height of the lower cantilever structure and is electrically connected to the cantilever bracket servo motor of the M lower cantilever structure adjustment devices; and the integrated data transmission module is configured to send the data of the wind temperature sensing unit and the solar radiation sensor to the cloud server and is communicatively connected to the cloud server.

6. The movable system for automatically monitoring the correlated wind and temperature field of the bridge according to claim 5, wherein the bridge structure-specific temperature monitoring module comprises a temperature data collection box and L patch-type temperature sensors; the L patch-type temperature sensors are distributed on an inner surface of the bridge cross-section and a bridge pavement, and are communicatively connected to the temperature data collection box through a data cable; and the temperature data collection box is also communicatively connected to the cloud server.

* * * * *